United States Patent
Smith et al.

(10) Patent No.: US 9,922,043 B1
(45) Date of Patent: Mar. 20, 2018

(54) DATA MANAGEMENT PLATFORM

(71) Applicants: Daniel Allen Smith, Portland, OR (US); Bruce J. Schuchardt, Newberg, OR (US); Xiaojian Zhou, Portland, OR (US)

(72) Inventors: Daniel Allen Smith, Portland, OR (US); Bruce J. Schuchardt, Newberg, OR (US); Xiaojian Zhou, Portland, OR (US)

(73) Assignee: Pivotal Software, Inc., San Francisco, CA (US)

( * ) Notice: Subject to any disclaimer, the term of this patent is extended or adjusted under 35 U.S.C. 154(b) by 580 days.

(21) Appl. No.: 14/524,529

(22) Filed: Oct. 27, 2014

Related U.S. Application Data

(60) Provisional application No. 61/896,466, filed on Oct. 28, 2013.

(51) Int. Cl.
  *G06F 17/30* (2006.01)
  *G06F 12/02* (2006.01)

(52) U.S. Cl.
  CPC .... *G06F 17/30174* (2013.01); *G06F 12/0253* (2013.01); *G06F 17/30309* (2013.01); *G06F 17/30575* (2013.01); *G06F 2212/702* (2013.01)

(58) Field of Classification Search
  CPC ......... G06F 17/30174; G06F 17/30575; G06F 17/30578; G06F 17/30581
  USPC ........................................ 707/610, 625, 638
  See application file for complete search history.

(56) References Cited

U.S. PATENT DOCUMENTS 6,351,753 B1 * 2/2002 Jagadish ........... G06F 17/30356
8,873,572 B2 10/2014 Bahr 2003/0198381 A1 10/2003 Tanaka et al.
2004/0205048 A1 10/2004 Pizzo et al.
2005/0222931 A1 10/2005 Mamou et al.
2006/0005013 A1 1/2006 Huitema et al.
2006/0271557 A1 11/2006 Harward et al.
(Continued)

OTHER PUBLICATIONS

International Search Report and Written Opinion in International Application No. PCT/US2014/062730, dated Apr. 15, 2015, 15 pages.
International Search Report and Written Opinion in International Application No. PCT/US2014/062737, dated Feb. 23, 2015, 8 pages.
(Continued)

*Primary Examiner* — Thu Nguyet T Le
(74) *Attorney, Agent, or Firm* — Fish & Richardson P.C.

(57) ABSTRACT

Methods, systems, and apparatus, including computer programs encoded on computer storage media, for distributed data management. One of the methods includes maintaining, by a first member in a distributed data management system having multiple computing members installed on multiple respective computers, a first garbage collection version vector that includes, for each member in the distributed data management system, a garbage collection version that represents a number of garbage collection processes performed by the member on a respective copy of a replicated data region maintained by the member in the data management system. If the first garbage collection version vector is different than a second garbage collection version vector received from a different provider member, a first replication process is performed that is different than a second replication process that is performed when the first garbage collection version vector matches the second garbage collection version vector.

27 Claims, 10 Drawing Sheets

(56) References Cited

U.S. PATENT DOCUMENTS

| | | |
|---|---|---|
| 2007/0061444 A1 | 3/2007 | Venkatesan et al. |
| 2008/0126357 A1 | 5/2008 | Casanova et al. |
| 2008/0208820 A1 | 8/2008 | Usey et al. |
| 2009/0018996 A1 | 1/2009 | Hunt et al. |
| 2010/0010967 A1 | 1/2010 | Muller |
| 2010/0023805 A1 | 1/2010 | Colaiacomo et al. |
| 2010/0069035 A1 | 3/2010 | Johnson |
| 2010/0121817 A1 | 5/2010 | Meyer et al. |
| 2010/0174692 A1 | 7/2010 | Meyer et al. |
| 2011/0093500 A1 | 4/2011 | Meyer et al. |
| 2011/0231698 A1* | 9/2011 | Zlati .................. G06F 11/3006 714/3 |
| 2012/0246202 A1 | 9/2012 | Surtani et al. |
| 2013/0110778 A1 | 5/2013 | Taylor et al. |
| 2013/0117240 A1 | 5/2013 | Taylor et al. |
| 2013/0163659 A1 | 6/2013 | Sites |
| 2014/0149485 A1 | 5/2014 | Sharma et al. |
| 2014/0156586 A1 | 6/2014 | Black et al. |
| 2015/0120656 A1 | 4/2015 | Ramnarayanan et al. |
| 2015/0120684 A1 | 4/2015 | Bawaskar et al. |

OTHER PUBLICATIONS

"Amazon S3," Wikipedia, Oct. 11, 2013, Retrieved from the Internet: URL:http://en.wikipedia.org/w/index.php?title=Amazon_S3&oldi d=577552788, 7 pages.

"Apache Hadoop," Wikipedia, Oct. 25, 2013, Retrieved from the Internet: URL:http://en.wikipedia.org/w/index.php?title=Apache_Hadoop&oldid=578665526, 18 pages.

Dean, "Dealing with Hadoop's small files problem," May 30, 2013, Retrieved from the Internet: URL:http://snowplowanalytics.com/blog/2013/05/30/dealing-with-hadoops-small-files-problem/, 8 pages.

Flajolet et al., "HyperLogLog: the analysis of a near-optimal cardinality estimation algorithm," Conference on Analysis of Algorithms, 2007, AofA 07, Jun. 22, 2007, Retrieved from the Internet: URL http://www.dmtcs.org/dmtcs-ojs/index.php/proceedings/article/viewFile/dmAH0110/2100, 20 pages.

White, "The Small Files Problem," Feb. 2, 2009, Retrieved from the Internet: URL:http://blog.cloudera.com/blog/2009/02/the-small-files-problem/, 5 pages.

\* cited by examiner

Operational Memory

Data Region "Students"
Eviction Criteria: "Updated > 5 min."
Id: 1234: First Name: John, Updated: 1 min.
Id: 5342: First Name: Mary, Updated: 4 min.
~~Id: 3245: First Name: John, Updated: 15 min.~~ ⟵ 227
~~Id: 6665: First Name: Ben, Updated: 8 min.~~ ⟵ 228
Id: 8832: First Name: Luke, Updated: 2 min. ⟵ 229

Id: 8832: First Name: Luke, Updated: 2 min.

210b

Data Region "Students"
Id: 1234: First Name: John, Updated: 1 min.
Id: 5342: First Name: Mary, Updated: 4 min.
Id: 3245: First Name: John, Updated: 15 min.
Id: 6665: First Name: Ben, Updated: 8 min.
Id: 8832: First Name: Luke, Updated: 2 min.

Non-Operational Memory

FIG. 2B

DATA MANAGEMENT PLATFORM

CROSS REFERENCE TO RELATED APPLICATIONS

This application claims the benefit under 35 U.S.C. § 119(e) of the filing date of U.S. Provisional Patent Application No. 61/896,466, filed on Oct. 28, 2013, entitled "Data Management Platform," the entirety of which is herein incorporated by reference.

BACKGROUND

This specification relates to cloud computing.

In cloud computing, data can be distributed to a system of multiple computers connected by one or more communications networks. Each computer can host one or more servers, each of which processes a portion of the data. The servers can process the data in parallel. Such a distributed system can handle web-oriented and data-intensive applications deployed in a virtualized environment. For example, a distributed system can be configured to perform functions of a relational database management system (RDBMS) over the Internet. Some challenges of a distributed system replacing a conventional RDBMS include performing data synchronization among multiple servers in the system, achieving low latency over a wide area network (WAN), scalability, and handling different schemas of multiple users.

SUMMARY

This specification describes a distributed data management system that provides for runtime user-specified eviction criteria for evicting data entries from operational memory. The data management system generates index reference files that can be used to efficiency recover operational memory indexes after a system restart. The system also employs garbage collection region vectors for guiding replication of data regions.

In general, one innovative aspect of the subject matter described in this specification can be embodied in methods that include the actions of receiving, from a user, a definition of a data region including an eviction criterion for data entries to be evicted from operational memory of each computing member; storing a portion of the data region in the operational memory of the multiple computing members; evaluating, by each member of the multiple computing members, the eviction criterion for the one or more data entries of the data region stored in operational memory of the respective member; determining, by a particular member of the multiple computing members, that the eviction criterion is satisfied for a data entry of the data region stored in operational memory of the particular member; and in response to determining that the eviction criterion is satisfied for the data entry of the data region stored in operational memory of the particular member, removing the data entry of the data region from the operational memory of the particular node. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. The actions include in response to removing the data entry of the data region from the operational memory of the particular node, loading one or more data entries of a different second data region into the operational memory of the particular member. Removing the one or more data entries of the data region from the operational memory of the particular node comprises removing the one or more data entries of the data region from the operational memory of the particular member without propagating the removal of the one or more data entries to the non operational memory of the particular member. The operational memory has a lower access latency than the non operational memory. The actions include initializing a respective eviction task on each member of the multiple computing members of the data management system, wherein each eviction task repeatedly evaluates the eviction criterion for each data entry on each member. That the eviction criterion is satisfied for a data entry of the data region stored in operational memory of the particular member comprises evaluating the eviction predictate on a value of the data entry. The eviction criterion specifies an eviction frequency, and further comprising evaluating the eviction criterion for the one or more data entries of the data region according to the eviction frequency. The actions include evaluating the eviction criterion for the one or more data entries of the data region according to the eviction frequency. The eviction criteria is specified by an structured query language an object query language statement. The eviction criteria is received at runtime. The actions include storing the full data region in the non-operational memory of the distributed data management system.

In general, another innovative aspect of the subject matter described in this specification can be embodied in methods that include the actions of maintaining an event file of an operation log for a data region of a distributed data management system, wherein the event file stores events describing requests to update data entries of the data region during the lifetime of the event file, wherein each event in the event file has an event identifier; receiving, by a first computing member in the distributed data management system, data identifying keys that were created or updated in the data region during the lifetime of the event file, and, for each key, a corresponding event identifier for the creation or update of the key, and wherein the event identified by the event identifier stores a value associated with the creation or update of the key in the data region; obtaining, for each of the keys that were created or updated during the lifetime of the event file, an indexed value of the data region from an index of data entry values in the data region to data entry keys having those values in the data region; and generating an index reference file that stores the indexed values and, for each indexed value, event identifiers that correspond to the creation or update of keys in the index having the indexed value. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. The actions include receiving a request to restore a second index from the index reference file; obtaining the index reference file; and generating an index comprising the indexed value in the index reference file and, for each indexed value, event identifiers that each correspond to the creation or update of a key. The actions include receiving a request for indexed keys that have a same value; identifying, from the second index, one or more event identifiers for the same value; and obtaining one or more keys referenced by the one or more event identifiers from an event file. The actions include replacing, in the second index, the event identifiers with the obtained one or more keys. The actions include obtaining data identifying keys deleted during the lifetime of the event file; and filtering the keys that were created or updated in the data region during the lifetime of the event file with the keys deleted during the lifetime of the event file. The index reference file is stored in non operational memory. The actions include determining that an operation log is rolling over by creating a new event file; and in response to determining that an operation log is rolling over by creating a new event file, receiving a request to generate the index reference file.

In general, another innovative aspect of the subject matter described in this specification can be embodied in methods that include the actions of maintaining, by a first member in a distributed data management system having multiple computing members installed on multiple respective computers, a first garbage collection version vector that includes, for each member in the distributed data management system, a garbage collection version that represents a number of garbage collection processes performed by the member on a respective copy of a replicated data region maintained by the member in the data management system; receiving a second garbage collection version vector from a different provider member; determining that the first garbage collection version vector is different than the second garbage collection version vector; and in response to determining that the first garbage collection version vector is different than the second garbage collection version vector, performing a first replication process that is different than a second replication process that is performed when the first garbage collection version vector matches the second garbage collection version vector. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. The second replication process is a delta replication process. The first replication process is a full replication process, and further comprising: receiving all data entries stored on the provider member. The actions include receiving all data entries stored on the provider member. The first replication process is a full replication process, and further comprising: revoking an update to a data entry stored on the first member. The actions include revoking an update to a data entry stored on the first member. The actions include determining that the first member has restarted; and requesting the second garbage collection version vector from the provider member. A garbage collection process clears memory occupied by a data entry that is designated as a deleted data entry. The actions include receiving a request to delete the data entry; and designating the data entry as deleted. The actions include performing, by the first member, a garbage collection process on one or more data entries that are designated as deleted; incrementing a garbage collection version in the first garbage collection version vector; and distributing the first garbage collection version vector to one or more other members of the distributed data management system.

Particular embodiments of the subject matter described in this specification can be implemented to realize one or more advantages. Providing the functionality for runtime eviction criteria can allow users and developers more flexible and powerful control over data entries that are stored in fast, operational memory. Using index reference files to recover indexes in operational memory improves system restart performance. Garbage collection region version vectors helps guide system members in determining a replication strategy while reducing the amount of data exchanged between system members to make such determinations.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTIONS OF DRAWINGS

FIG. 2B illustrates evicting data entries according to an eviction criteria.

Like reference numbers and designations in the various drawings indicate like elements.

DETAILED DESCRIPTION

Figure 1:
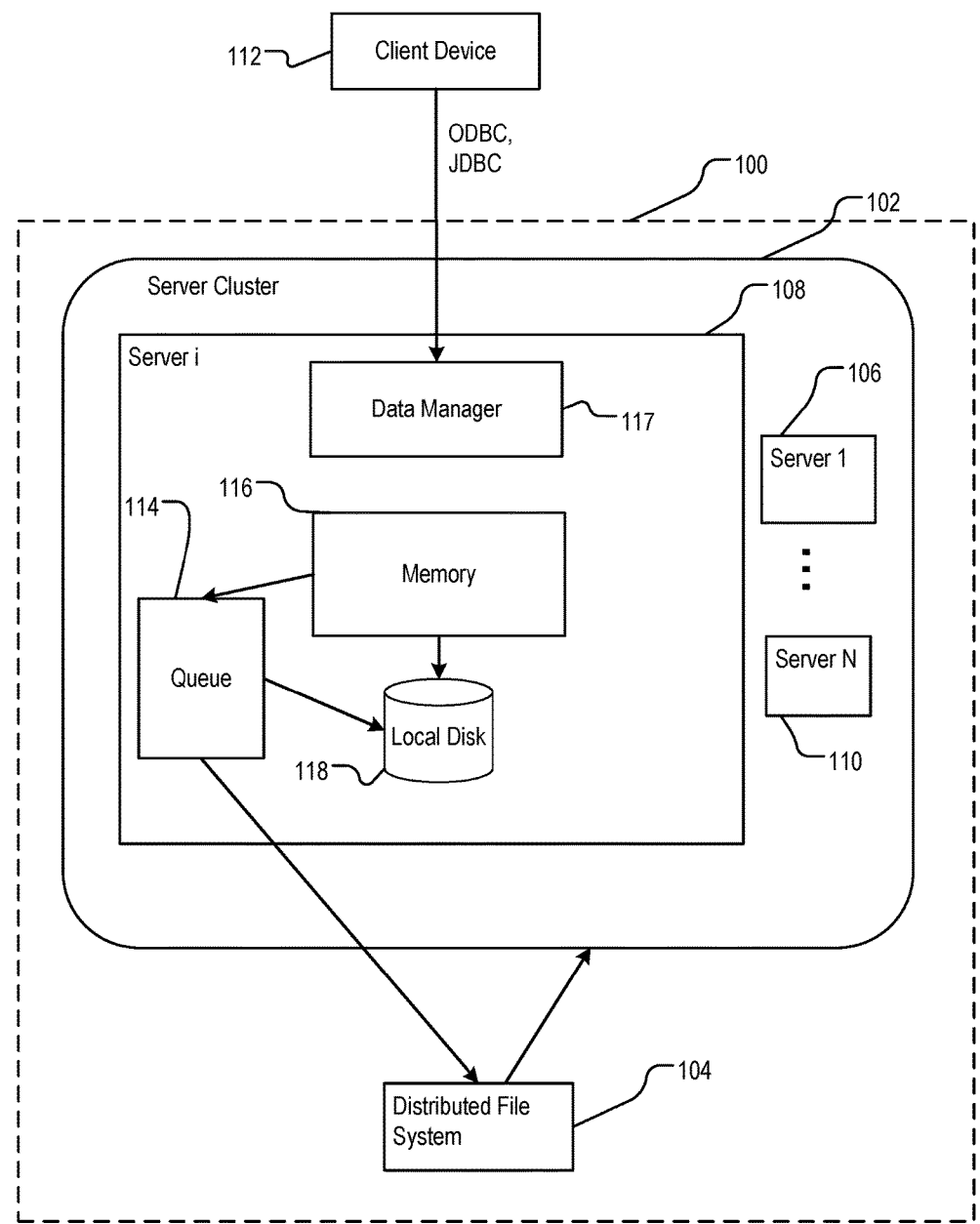
FIG. 1 is a block diagram of an example system.

FIG. 1 is a block diagram of an example system 100. The system 100 is a memory-optimized, distributed data management platform that is configured to provide data access to data-intensive applications, e.g., online transaction processing (OLTP) tasks.

Client applications can access the distributed data in the system 100 without having knowledge of the underlying system architecture. Data in the system 100 can be stored logically in data regions, with each data region defining a key namespace. In other words, keys are unique within the data region. Data regions may be thought of as a database table, but need not be stored in memory in a structure or an arrangement that resembles a table. Each data region stores one or more data entries, which are stored as key-value pairs. Each data region can be replicated, i.e., identical copies of the data region can be stored on multiple members of the system 100, or partitioned, i.e., different portions of the data region can be stored on multiple members of the system 100.

The system 100 includes a server cluster 102 that includes multiple servers. The servers are connected to each other through a communications network, e.g., a wide area network (WAN), in a peer-to-peer (P2P) topology. Each server in the system 100 can be implemented as one or more physical computers or as software running on a virtual machine of a physical computer. The system 100 includes a first server 106, and an ith server 108, through an Nth server 110.

Each server runs a software system that establishes a logical member of the distributed system 100. The software system implementing the functionality of a single logical member of the system 100 may be installed on multiple physical or virtual servers. In this specification, a member of the system may refer to a server or the software system providing connectivity with other members of the distributed system 100, as the context requires.

Each member maintains persistent communication channels to every other member in the server cluster 102. Each member includes a volatile memory, and local non-volatile memory, e.g., one or more disks that are local to the member.

Each member of the system 100 has operational memory, which generally includes high-speed memory designed for fast random access by a processor, e.g., dynamic random-access memory (DRAM). Data regions that are stored in operational memory may be referred to as operational data.

Each member of the system 100 also has non-operational memory, which generally includes non-volatile mass storage memory, e.g. flash or disk memory. Data regions that are stored in non-operational memory may be referred to as non-operational data. The non-operational memory accessed by members of the system 100 can be implemented as a single logical system, e.g., a distributed file system 104. An example of the distributed file system 104 is the Hadoop™ Distributed File System (HDFS™) ("Hadoop" and "HDFS" are trademarks of the Apache Software Foundation.)

In this specification, non-operational data refers to data in non-operational memory as distinguished from operational data stored in operational memory. The system 100 can thus perform operations on both operational and non-operational data.

Each member of the system 100 includes a data manager 117 that manages data regions. The data manager 117 is a software system that can be implemented as one or more computer programs installed on one or more members of the system 100. In general, each member of the system 100 will have at least one data manager.

The data manager 117 establishes connectsions to other members and coordinates which data is stored in operational memory and data that is stored in non-operational memory. For example, if all the data entries of a particular data region do not fit in the operational memory available to members of the system 100, the data managers can replicate or partition some data entries of the data region into non operational memory.

The operational memory will typically have access latency that is significantly smaller than the non operational memory. Thus, the data manager 117 will generally take steps to improve the probability that data requested by client applications is available as operational data rather than as non operational data.

Certain functionality of the data manager 117 may also be implemented by computer programs installed on one or more other servers. For example, part of the data manager 117 can include a service process that receives and parses queries from a client device 112 and routes corresponding data updates to appropriate members of the system 100.

The data manager 117 can receive a data update request to update a data entry in a particular data region from a client application installed on a client device 112. The data update request can include commands for inserting, deleting, or updating data entries handled by the data manager 117. The request can include structured query language (SQL) and object query language (OQL) statements, and can be received through any application programming interface (API), including Open Database Connectivity (ODBC) and Java Database Connectivity (JDBC), supported by the data manager 117.

The data manager 117 can replicate the update request to all other members of the system 100 for replicated data regions. The data manager 117 can also route the update request to an appropriate member for partitioned data regions. The data manager 117 stores data update requests in a queue 114. The queue 114 stores multiple data update requests to data entries in data regions to effectuate batch writes to the distributed file system 104. In other words, once the queue 114 has stored minimum number of requests to update data entries, the data manager 117 writes the updates stored in the queue to the distributed file system 104. If the queue 114 reaches a threshold size, the data manager 117 can overflow additional entries that would otherwise go to the queue 114 to the distributed file system 104.

Users can define data regions to have particular attributes that control how the data manager 117 stores, distributes, and manages the data region. For example, a user can define an eviction policy for a data region that controls when the data manager 117 will remove data entries of the data region from the operational memory. A user can specify a data region attributes using APIs of the data manager 117 or through a configuration file, e.g., written as an extensible markup language (XML) file.

The data manager 117 maintains operation logs either on the local disk 118 or in the distributed file system 104. The data manager 117 uses the operation logs to record a history of updates on each data region or on each data entry, according to a log setting. The data manager 117 can compact the operation logs according to a compaction strategy. For example, a compaction strategy can specify that obsolete operations be removed from a log file when the size of the log file reaches a threshold, e.g., one gigabyte (1 GB). The log setting and compaction strategy can be specified by a user in a configuration file.

Figure 2A:
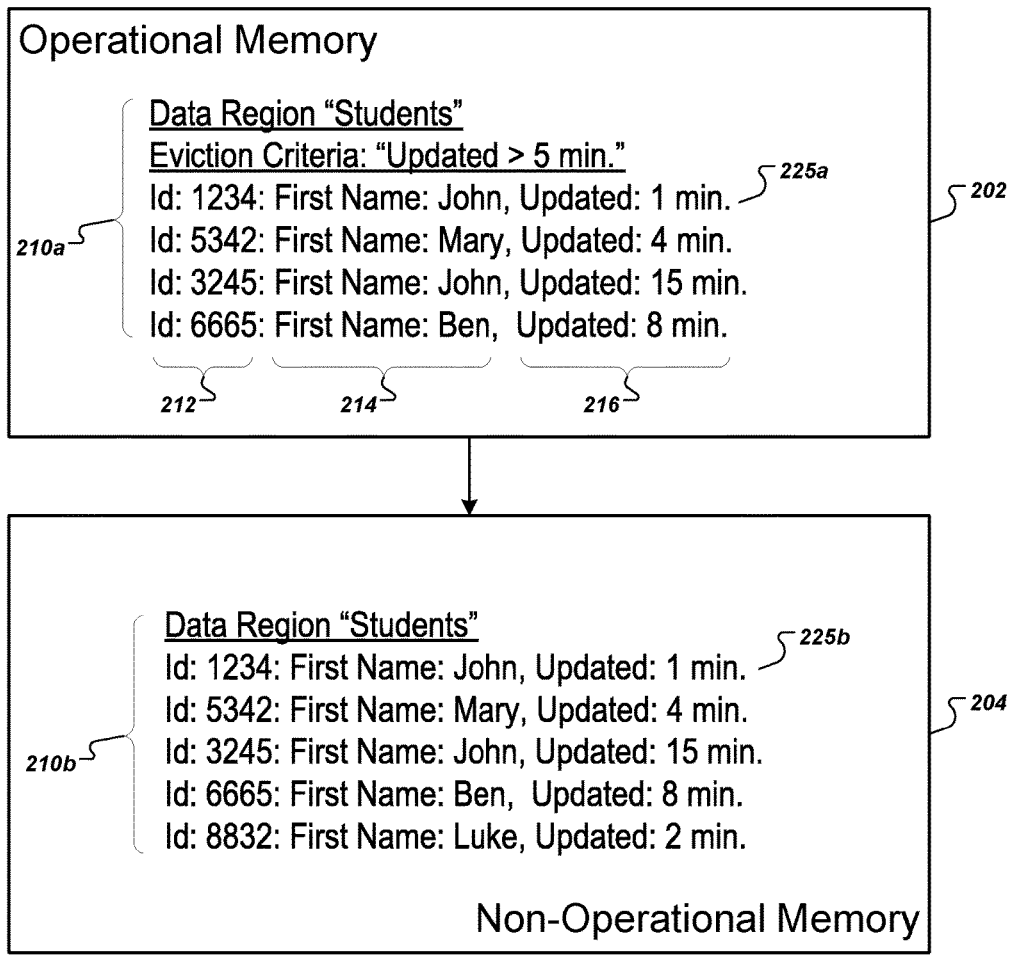
FIG. 2A illustrates a data region defined with an eviction criterion.

FIG. 2A illustrates a data region defined with an eviction criterion. A data region can be defined by a user to have one or more eviction criteria, which are conditions under which particular data entries of the region will be evicted from operational memory. FIG. 2A illustrates a segment of operational memory 202 and a segment of non-operational memory 204, which can be associated with a member of the system 100 described in FIG. 1.

The data region name is "Students" and stores data about a number of students, including an identifier 212, a first name 214, and a last updated value 216, which represents how much time has passed since the corresponding data entry was updated. The data region is persisted in non-operational memory in data entries 210*b*. The data entries loaded into operational memory 210*a* are thus also stored in non-operational data entries 210*b*. For example, the data entry 225 for "John" is loaded into operational memory 202 and is also persisted in non-operational memory as data entry 225*b*. The data region has an associated eviction criterion, "Updated >5 min." The system will thus evict data entries that are located in operational memory if they meet the eviction criterion.

A user can define one or more eviction criteria for a data region at runtime. In other words, the user can provide the eviction criteria at the time that the data region is defined. In some implementations, the eviction criteria are specified through a reserved EVICTION command, which can be implemented as part of a query language or API supported by the system. In some implementations, the EVICTION command is implemented as part of SQL or OQL.

For example, a user can define a data region by issuing the following command using SQL:
CREATE TABLE "Students"
EVICTION BY "Updated >5 min."
Id number(5),
First varchar(15),
Updated number(5);

The EVICTION BY command can be followed by a generic eviction predicate that specifies the conditions under which data entries should be evicted from operational memory.

A user can also specify an eviction frequency that determines how often the system should check for data entries to evict from operational memory. For example, if the user specifies an eviction frequency of five minutes, the system will check all data entries in operational memory once every five minutes and evict from operational memory those data entries that satisfy the eviction criteria.

FIG. 2B illustrates evicting data entries according to eviction criteria. The data region for "Students" has an eviction criterion "Updated >5 min." Because data entries 227 and 228 have "Updated" values that satisfy the eviction criterion, the system evicts those data entries from operational memory. The data entries are still persisted in non-operational memory; thus, in some implementations, eviction of data entries requires no writes to non-operational memory.

The eviction of data entries from the operational memory can free up space for other data entries to be loaded into the operational memory. For example, the system can load data entry 229 into operational memory from the non-operational memory in response to the data entries 227 and 228 being evicted according to the eviction criterion.

Figure 3:
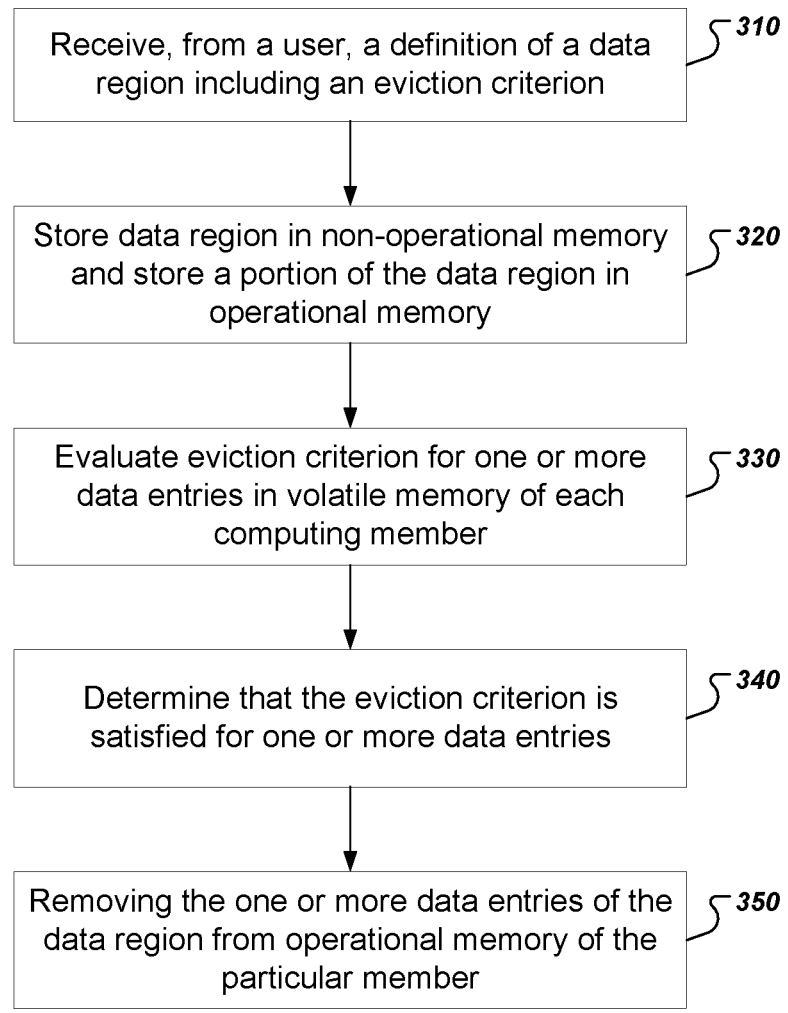
FIG. 3 is a flow chart of an example process for defining a data region having an eviction criterion.

FIG. 3 is a flow chart of an example process for defining a data region having an eviction criterion. In general, a user defines, at runtime, a data region having an eviction criterion. At regular intervals, each member of the system checks all data entries in its operational memory to see if any of the data entries satisfy the eviction criterion. Data entries that satisfy the eviction criterion are evicted from operational memory, which may allow the system to load other data entries into operational memory. The process can be implemented by one or more computer programs installed on one or more computers. The process will be described as being performed by a data manager, e.g. the data manager 117 of FIG. 1.

The data manager receives, from a user, a definition of a data region; the definition includes an eviction criterion (310). The eviction criterion can include any appropriate generic predicate that can be evaluated on data entries, e.g., "Age >30." The user can also specify generic eviction criteria, for example, "least recently used" to evict data entries that were accessed the least recently. The data region can be either a partitioned or a replicated data region.

The data manager stores the data region in non-operational memory, and the data manager stores a portion of the data region in operational memory (320). In general, the data manager will persist the entire data region in non-operational memory, and the data manager will store a portion of the data region in operational memory of a member.

The data manager evaluates the eviction criterion for one or more data entries in operational memory of each member (330). In general, each member of the system will start an eviction task to determine whether data entries in operational memory of the member satisfy the eviction criterion. The user can also specify an eviction frequency at which the system should check data entries in operational memory. For example, a user can specify an eviction frequency of five minutes. Each member of the system can then start a task that checks the data entries in operational memory of the member in order to determine if the data entries satisfy the eviction criterion.

The data manager determines that the eviction criterion is satisfied for one or more data entries (340).

The data manager removes the one or more data entries of the data region from operational memory of the particular member (350). Because the data entries are replicated in non-operational memory, the system need not modify the corresponding data entries stored in non-operational memory.

Removing the data entries from operational memory creates free space in the operational memory of the affected member. Thus, the system can load other data entries into operational memory from a same data region or from a second different data region.

Figure 4A:
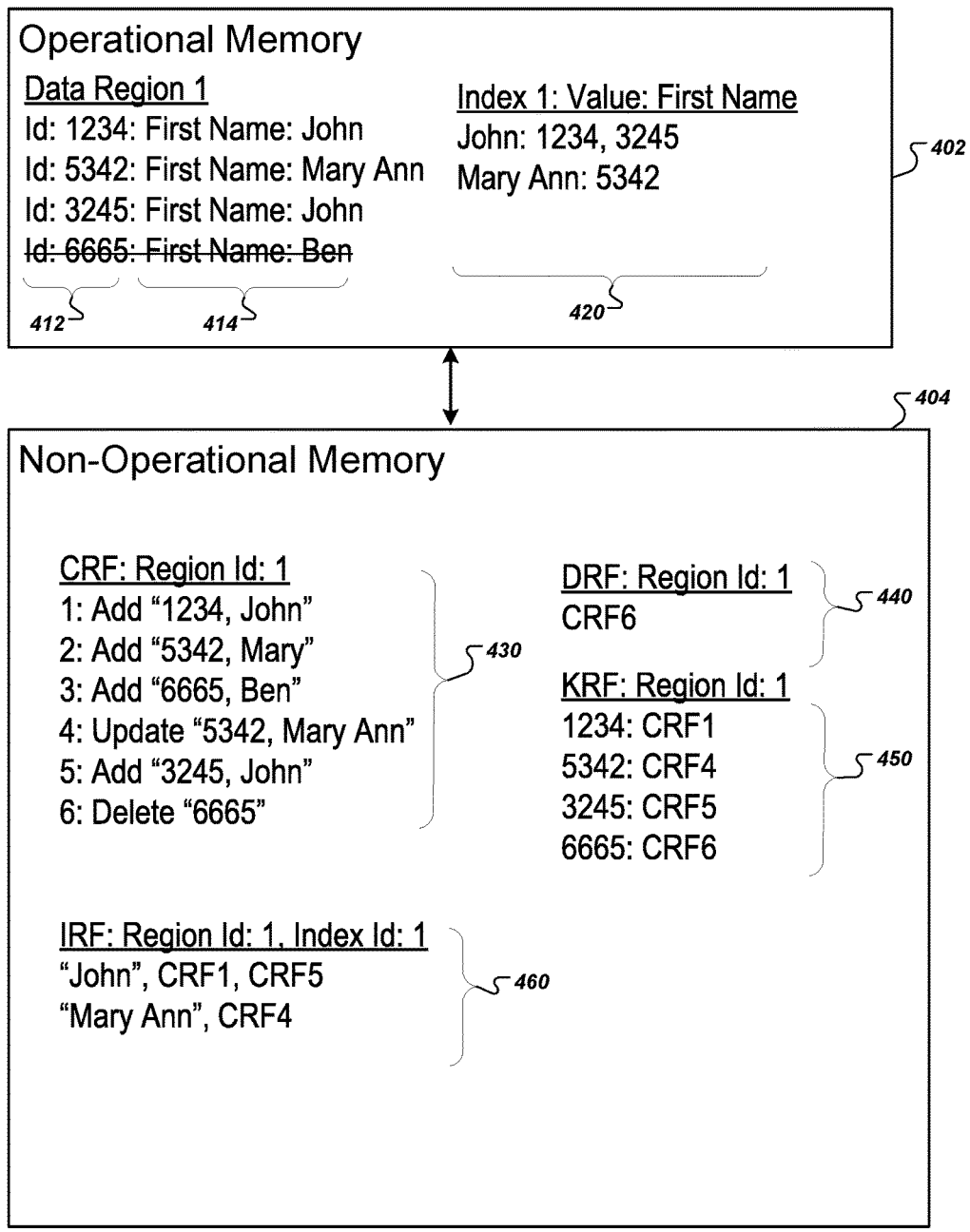
FIGS. 4A and 4B illustrate using index reference files to improve system recovery.
Figure 4B:
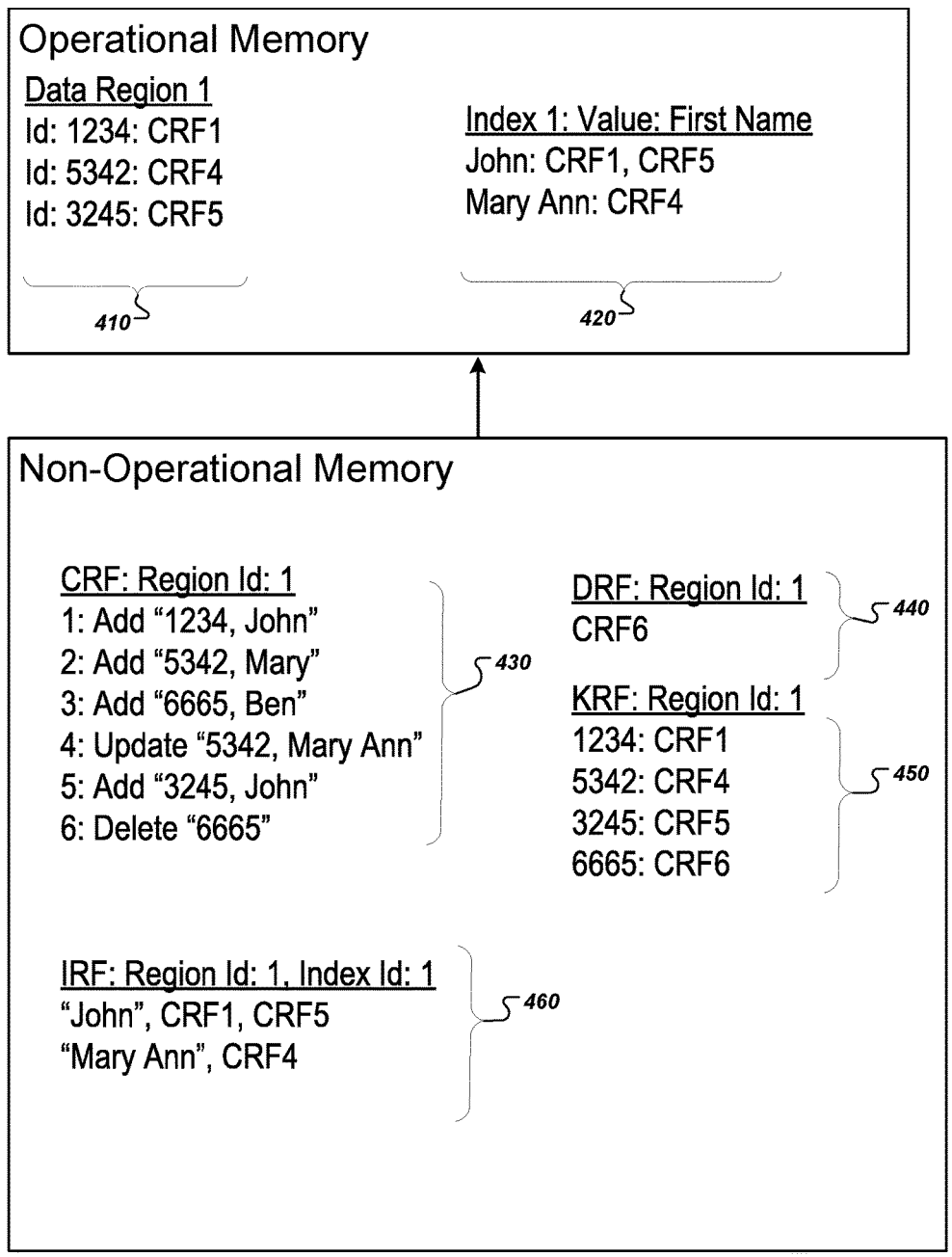

FIGS. 4A-B illustrate using index reference files (IRFs) to improve system recovery. When a member of the system goes down due to a server crash, a hardware failure, or routine maintenance, reading data entries from non-operational memory back into operational memory and rebuilding indexes can be costly both in time and network bandwidth. Instead, the system can use operation logs and IRFs to improve system restart performance.

The system is illustrated as having a single data region that stores Ids 412 and corresponding first names 414. Although not shown, the full data region will also typically be persisted in the non-operational memory 404.

To improve querying performance, the system can build an index 420, e.g., as a list or a set that maintains information about data entries that have a same value. For example, in FIG. 4A, "Index 1" 420 indexes the data by the first name attribute. The "John" attribute is held by data entries having Id values "1234" and "3245." The "Mary Ann" attribute is held by the data entry having the Id value "5342," and the "Ben" attribute is held by the data entry having the Id value "6665."

The system stores a list of all update events for data entries of a data region in a file called the create reference file (CRF) 430. Each event in the CRF has a CRF entry identifier. The number of updates to data entries can be quite large. Thus, the system can "roll over" an operation log by retiring a current CRF and creating a new CRF in order to keep the size of individual CRFs manageable.

The system can improve the restart time of members by using a delete reference file (DRF) 440 and a key reference file (KRF) 450. The DRF 440 stores a list of CRF entries that correspond to keys deleted in the data region during the lifetime of the CRF. The KRF 450 stores a list of all keys that were created or updated in the data region during the lifetime of the CRF, along with corresponding CRF entry identifiers. For example, the KRF includes an entry for key "1234" and a corresponding CRF entry identifier "CRF1," which references the creation of the key "1234" in the first entry of the CRF. The DRF 440 includes the CRF entry "CRF6," which references the CRF entry that recorded the deletion of key "6665."

In some implementations, a single IRF is created for each CRF at the time that a member rolls over the operation log by creating a new CRF. This can happen, for example, when a current CRF reaches a predetermined maximum size, e.g., 1, 10, or 100 GB. Then, the system can create an IRF to correspond to the retired CRF as well as create a new CRF. Furthermore, the system may force a rollover to a new CRF when a new index is created in the operational memory to avoid missing entries in the IRF.

FIG. 4B is a diagram of using index reference files after a member restart. When a member restarts, all operational data in the volatile operational memory of the member is lost and must be recovered. The member can avoid the costly reading of all data entry values from non-operational memory or all event updates from the CRFs by instead using the KRF, DRF, and IRF. When the member restarts, the member filters the KRF by entries in the DRF and loads the remaining keys into operational memory. For example, after the restart, the keys in the KRF are filtered to exclude keys referenced by DRF entries, leaving only keys "1234," "5342," and "3245," as the DRF includes a reference to CRF entry identifier "CRF6" that corresponds to the deletion of key "6665." The values associated with the keys are then loaded from non operational memory into operational memory only when requested by a client application.

The system thus loads the filtered keys for the data region 410 into operational memory. Rather than reading the full data entries from non-operational memory, the system instead loads only the corresponding CRF entry identifiers. Then, the full data entries can be loaded into operational memory when the key is requested by a client application.

The system rebuilds the index 420 by reading the IRF 460. Rather than reading all of the indexed data entries to obtain the keys for the the index in operational memory, the system instead populates the index with the CRF entry identifiers for each value in the IRF. The full data entries and values can be loaded into operational memory when keys corresponding to the indexed value are requested by a client application.

Figure 5:
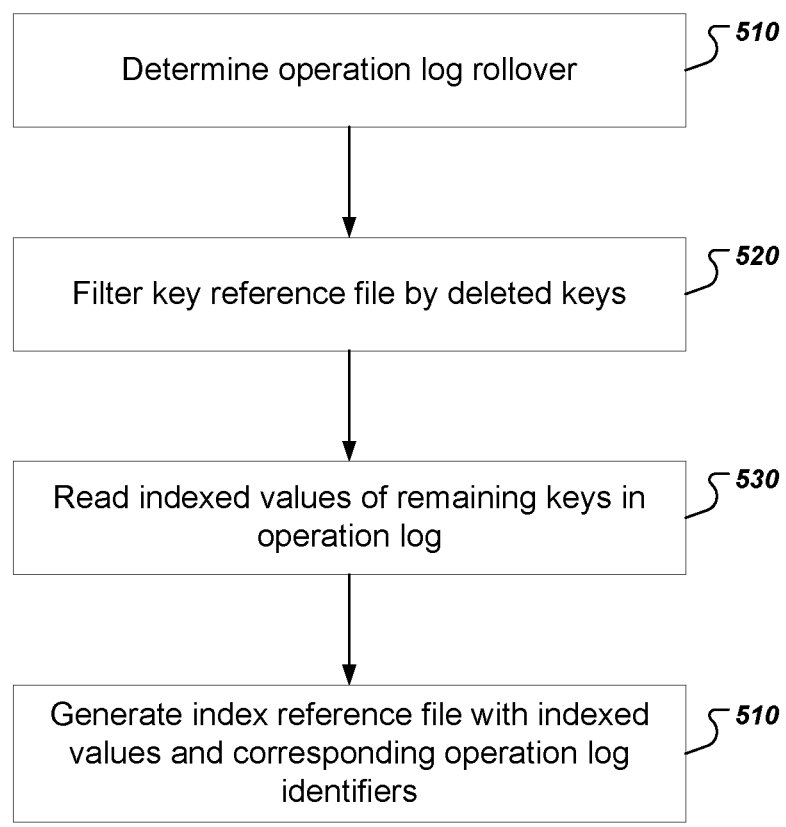
FIG. 5 is a flow chart of an example process for creating an index reference file.

FIG. 5 is a flow chart of an example process for creating an index reference file. In general, the system will create an index reference file when a CRF of an operation log is rolled over. The process can be implemented by one or more computer programs installed on one or more computers. The process will be described as being performed by a data manager, e.g. the data manager 117 of FIG. 1.

The data manager determines that an operation log is rolling over (510). The system can roll over an operation log by storing new entries in a new CRF. The system can roll over an operation log when the size of the CRF reaches a particular size or at periodic intervals.

The data manager obtains keys that were created during the active lifetime of the CRF (520). The data manager can obtain the keys created during the active lifetime of the CRF from the KRF.

The data manager filters out deleted keys (530). The data manager obtains delete operations stored in the DRF and removes keys obtained from the KRF that were affected by the delete operations stored in the DRF. In some implementations, the data manager obtains the CRF entry identifier stored in the DRF and obtains the the key from the corresponding CRF entry.

The data manager reads indexed values of remaining keys in the key reference file (540). The system can scan the index in operational memory for keys remaining after filtering the KRF with the DRF and the corresponding indexed values.

The data manager generates an index reference file with the indexed values and corresponding operation log identifiers (550). After determining which keys are indexed, the system can use the KRF to obtain the operation log identifiers corresponding to the indexed values. The system may generate multiple IRFs, one for each rolled over CRF. The system can keep track of the date that each IRF was created and can sort the IRFs by date of creation.

Figure 6:
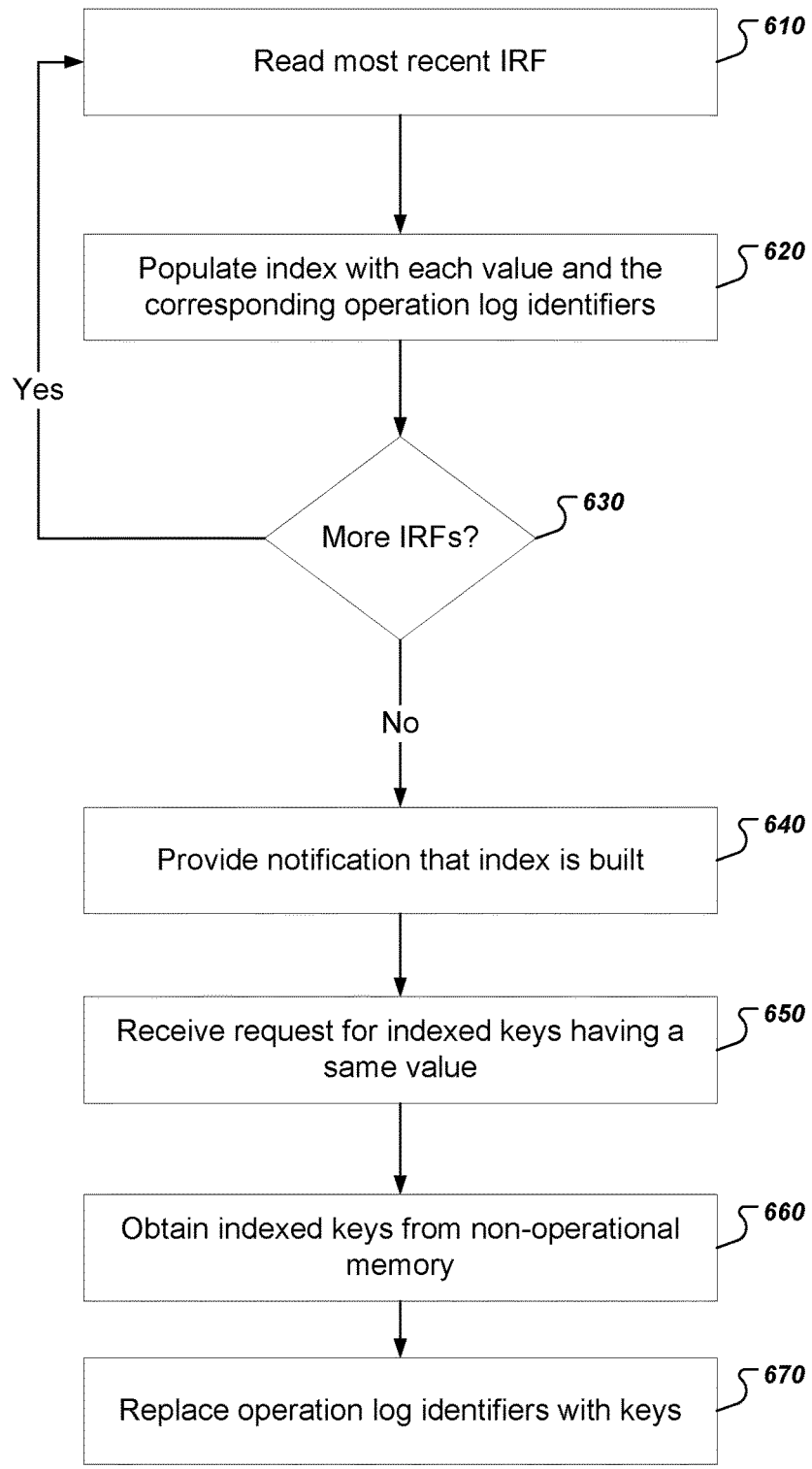
FIG. 6 is a flow chart of an example process for rebuilding an index using an index reference file.

FIG. 6 is a flow chart of an example process for rebuilding an index using an index reference file. In general, on a system restart the system will read the index reference files in reverse order of creation in order to quickly rebuild an index. The process can be implemented by one or more computer programs installed on one or more computers. The process will be described as being performed by a data manager, e.g. the data manager 117 of FIG. 1.

The data manager reads the most recent IRF (610). The IRF will store an association between values that should be indexed in the operational memory and the corresponding operation log identifiers that correspond to that value.

The data manager populates the index with each value and the corresponding operation log identifiers (620). The system can generally keep track of which (value, operation log identifier) pairs have been added to the index. If the system encounters another (value, operation log) identifier pair, the system can disregard that pair as outdated.

The data manager determines whether there are more IRFs for the index (630). If no IRFs remain, the system can provide a notification to another server or a client application that the index is built and ready for searching (branch to 640). If more IRFs need to be read, the system can read the next most recently created IRF (branch to 610) and continue populating the index.

The data manager receives a request for indexed keys (650). For example, a client application can request a list of all keys in the data region having a particular value using an SQL query.

The data manager obtains the indexed keys from non-operational memory (660). The rebuilt index will initially include only the data region values and the CRF entry identifiers that identify the mostly recent update to each corresponding key. Thus, the system can obtain the keys by accessing the CRF in non-operational memory and by obtaining the keys from the indexed CRF entries.

The data manager replaces the operation log identifiers in the index with the keys (670). After taking the time to read the keys from the CRF of the non-operational memory, the data manager replaces the CRF entry identifiers in the index of the operational memory with the actual keys. Thereafter, for another request for indexed keys, the data manager can obtain the actual keys directly from the operational memory.

Figure 7:
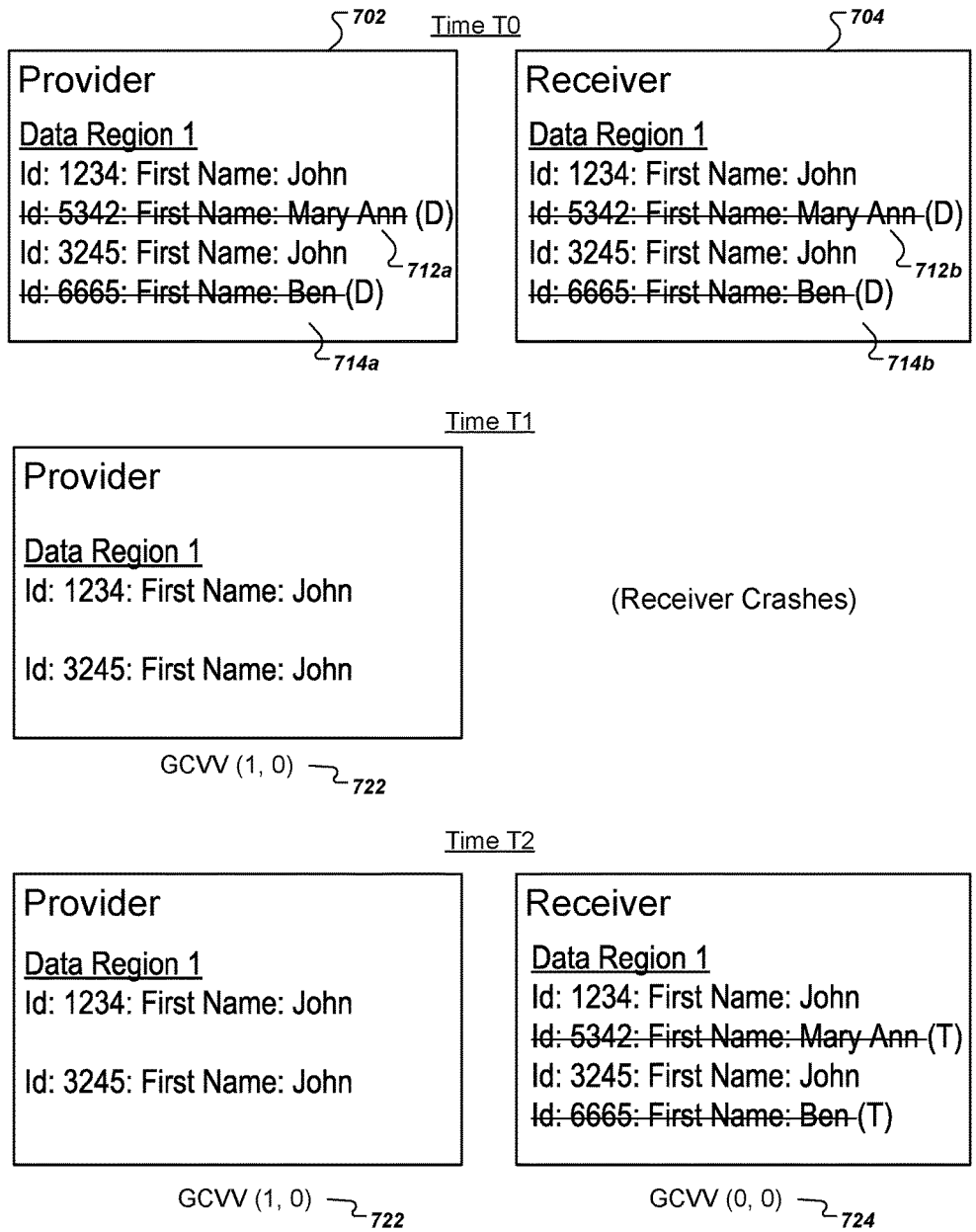
FIG. 7 illustrates using garbage collection region version vectors.

FIG. 7 illustrates using garbage collection region version vectors. In FIG. 7, two members, a provider 702, and a receiver 704, will use region version vectors to determine replication errors for a particular data region, for example, when a member crashes and has to restart. The provider 702 and the receiver 704 manage a replicated data region having a key "Id," and a single value, "First Name." The replicated data region illustrated in FIG. 7 may be stored in operational memory, non-operational memory, or both of the respective members.

At time T0, the provider 702 and the receiver 704 are synchronized in that the members have received the same updates to data entries of the data region. The provider 702 has received updates that deleted two data entries in the region, the data entry 712a and the data entry 714a. The receiver 704 has received the same updates that deleted corresponding replicated data entries, the data entry 712b and the data entry 714b.

To help maintain synchronization between members when a data entry is deleted, the system initially does not clear or erase the entry from memory, and instead only marks the entry as deleted, e.g., indicated by the "(D)" in FIG. 7. Some time later, each member will run a garbage collection process that clears the memory occupied by the data entry. Thus, the data entries 712a-b and 714a-b are marked as deleted, but have not yet been cleared from memory.

The system can maintain synchronization between members using region version vectors (RVV). Each RVV maintains a region version number for each other member in the system. The version number for a region is updated on a member after each update to a data entry of the region. For example, the provider 702 having a region version vector of (7, 7) for the data region indicates both that the provider 702 has updated the data region seven times, and also that the provider 702 has been notified that the receiver 704 has updated the data region seven times. Thus, from the provider's perspective, the provider 702 and the receiver 704 are synchronized.

In contrast, the receiver 704 having a region version vector of (7, 6) for the data region indicates that the receiver has updated the data region only six times, but that the provider 702 has updated the data region seven times. The receiver 704 can thus request the seventh update from the provider 702 and apply the seventh update to the data region to become synchronized with the provider 702 again. This process can be referred to as a delta replication process because the receiver 704 needs to receive only the missed seventh operation to become synchronized with the provicer 702.

In some situations, exchanging region version vectors alone is ambiguous or insufficient for the receiver 704 to determine which updates were missed. In these situations, the provider 702 and the receiver 704 must undergo a full replication process for the data region. During a full replication process, some actions performed by some members may be undone or revoked completely. The full replication process can be operationally expensive and time consuming. Thus, the provider 702 and the receiver 704 can attempt delta replication over full replication whenever possible.

However, inconsistent garbage collection processes between the provider 702 and the receiver 704 can cause some delta replication processes to result in an inconsistent state. In these situations, the provider 702 and the receiver 704 should undergo a full replication process to become synchronized again.

Thus, the system can maintain garbage collection region version vectors in order to determine when to trigger full replication between members. A garbage collection version vector maintains a garbage collection version for each other member in the system. Each time a member in the system performs a garbage collection process to remove deleted entries from memory, the member increments a garbage collection version. Then, the members of the system can exchange garbage collection version vectors to determine whether to perform a delta replication process or a full replication process.

At time T1, the receiver 704 crashes, and the provider 702 performs a routine garbage collection process that removes the entries 712a and 714a from memory. The provider increments its garbage collection version, resulting in the provider's garbage collection version vector of (1, 0).

At time T2, the receiver 704 starts again and reloads the data region, which may have been persisted in non-operational memory. The receiver 704 and the provider 702 can exchange the garbage collection version vectors 722 and 724. Because the receiver 704 has not performed a garbage collection process, the receiver 704 remains on garbage collection version 0.

The garbage collection version vector 722 from the provider 702 is inconsistent with the garbage collection version vector 724 of the receiver 704. Thus, the system can initiate a full replication process between the two members, rather than a delta replication process. This is due in part because the provider 702, having erased from memory the data entries 712a and 714a, no longer has the information about which data entries it has garbage collected.

Figure 8:
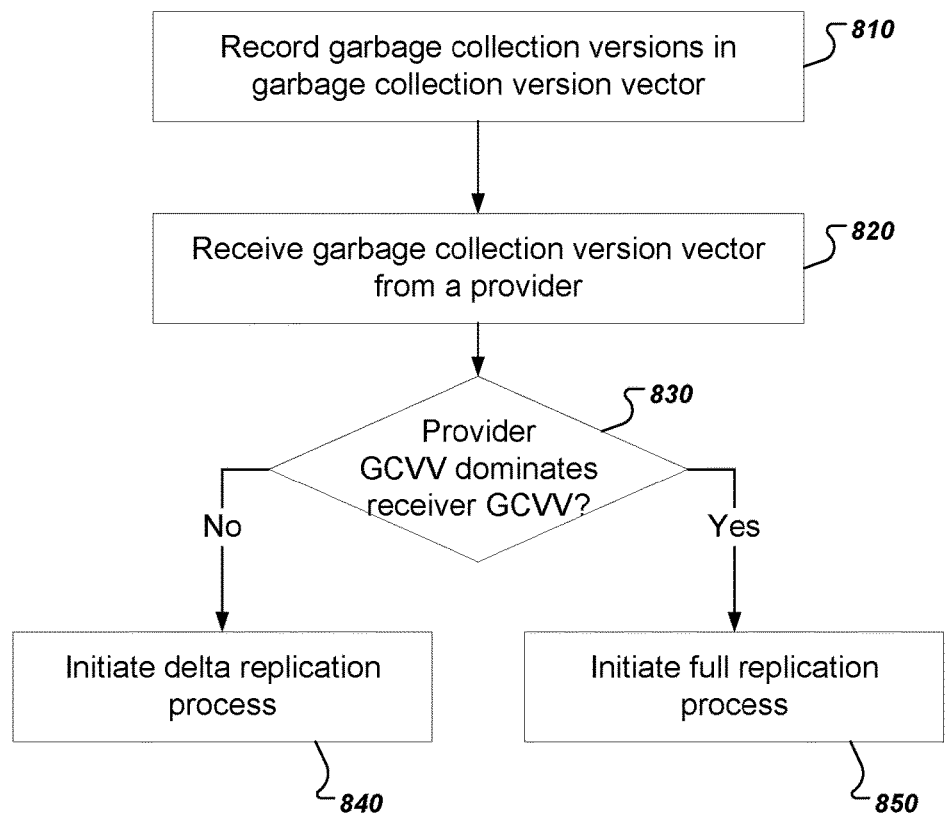
FIG. 8 is a flow chart of an example process for using garbage collection version vectors.

FIG. 8 is a flow chart of an example process for using garbage collection version vectors. In general, a system can compare garbage collection version vectors for two members to determine whether the members have synchronized garbage collection. If not, the system can engage in a full replication process rather than a delta replication process. The process can be implemented by one or more computer programs installed on one or more computers. The process will be described as being performed by a data manager, e.g. the data manager 117 of FIG. 1.

The data manager records garbage collection versions in a garbage collection version vector (810). In general, the data manager will increment a garbage collection version for its own member after each garbage collection process that removes deleted data entries from memory. The data manager will also record garbage collection versions for other members when it receives a notification of them from the other members.

In some implementations, when the data manager performs a garbage collection process, it distributes a notification of the process version to all other members of the system, e.g., by distributing a full garbage collection version vector. Likewise, the data manger can receive a notification of a version of garbage collection process performed by any other member of the system, e.g., by receiving that members garbage collection version vector.

The data manager receives a garbage collection version vector from a provider (820). The received garbage collection version vector will include information on the garbage collection processes performed by the provider and other members in the system that the provider received notifications for.

The data manager determines whether the provider's received garbage collection version vector dominates its own garbage collection version vector (830). In general, a vector A dominates another vector B if every component of A is at least that of the corresponding component of B, and if at least one component of A is greater than the corresponding component of B.

If the provider's garbage collection version vector does not dominate the receiver's garbage collection version vector, the data manager can initiate a delta replication process (branch to 840).

If the provider's garbage collection version vector dominates the receiver's garbage collection version vector, the data manager can instead initiate a full replication process (branch to 850). After performing the full replication process, the two members should again have synchronized data regions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:
1. A computer-implemented method comprising:
   Maintaining a respective garbage collection version vector for each member of a plurality of members in a distributed data management system, wherein each garbage collection version vector has a plurality of elements that each represent a respective count of garbage collection processes that have been performed by a corresponding member of the plurality of members of the distributed data management system, each garbage collection process being performed by each member on a respective copy of a replicated data region maintained by the member in the data management system and removing data entries marked as deleted in the data region from memory;

receiving, by a first member of the plurality of members having a first garbage collection version vector, a second garbage collection version vector maintained by a different second member of the plurality of members;

determining, by the first member, that the first garbage collection version vector is different than the second garbage collection version vector; and in response to determining that the first garbage collection version vector is different than the second garbage collection version vector, performing, by the first member, a first replication process that is different than a second replication process, wherein the second replication process is performed when the first garbage collection version vector matches every other garbage collection version vector received from one or more other members of the plurality of members.

2. The method of claim 1, wherein the second replication process is a delta replication process.

3. The method of claim 2, wherein the first replication process is a full replication process, and further comprising:
receiving all data entries stored on the second member.

4. The method of claim 1, wherein the first replication process is a full replication process, and further comprising:
revoking, by the first member, an update to a data entry stored on the first member.

5. The method of claim 1, further comprising:
determining, by the first member, that the first member has been restarted; and
in response, requesting, by the first member, the second garbage collection version vector from the second member.

6. The method of claim 1, wherein each garbage collection process clears memory occupied by each data entry that is marked as a deleted data entry.

7. The method of claim 6, further comprising:
receiving, by the first member, a request to delete a first data entry; and
in response, marking, by the first member, the data entry as deleted.

8. The method of claim 1, further comprising:
performing, by the first member, a garbage collection process to clear memory occupied by one or more data entries that are marked as deleted;
incrementing, by the first member, a garbage collection version in the first garbage collection version vector; and
distributing, by the first member, the first garbage collection version vector to one or more other members of the distributed data management system.

9. The method of claim 1, wherein determining that the first garbage collection version vector is different than the second garbage collection version vector comprises determining that every component of the second garbage collection version vector is at least that of a corresponding component of the first garbage collection version vector.

10. A system comprising:
one or more computers and one or more storage devices storing instructions that are operable, when executed by the one or more computers, to cause the one or more computers to perform operations comprising:

maintaining a respective garbage collection version vector for each member of a plurality of members in a distributed data management system, wherein each garbage collection version vector has a plurality of elements that each represent a respective count of garbage collection processes that have been performed by a corresponding member of the plurality of members of the distributed data management system, each garbage collection process being performed by each member on a respective copy of a replicated data region maintained by the member in the data management system and removing data entries marked as deleted in the data region from memory;

receiving, by a first member of the plurality of members having a first garbage collection version vector, a second garbage collection version vector maintained by a different second member of the plurality of members;

determining, by the first member, that the first garbage collection version vector is different than the second garbage collection version vector; and in response to determining that the first garbage collection version vector is different than the second garbage collection version vector, performing, by the first member, a first replication process that is different than a second replication process, wherein the second replication process is performed when the first garbage collection version vector matches every other garbage collection version vector received from one or more other members of the plurality of members.

11. The system of claim 10, wherein the second replication process is a delta replication process.

12. The system of claim 11, wherein the first replication process is a full replication process, and wherein the operations further comprise:
receiving all data entries stored on the second member.

13. The system of claim 10, wherein the first replication process is a full replication process, and wherein the operations further comprise:
revoking, by the first member, an update to a data entry stored on the first member.

14. The system of claim 10, wherein the operations further comprise:
determining, by the first member, that the first member has been restarted; and
in response, requesting, by the first member, the second garbage collection version vector from the second member.

15. The system of claim 10, wherein each garbage collection process clears memory occupied by each data entry that is marked as a deleted data entry.

16. The system of claim 15, wherein the operations further comprise:
receiving, by the first member, a request to delete a first data entry; and
in response, marking, by the first member, the data entry as deleted.

17. The system of claim 10, wherein the operations further comprise:
performing, by the first member, a garbage collection process to clear memory occupied by one or more data entries that are marked as deleted;
incrementing, by the first member, a garbage collection version in the first garbage collection version vector; and distributing, by the first member, the first garbage collection version vector to one or more other members of the distributed data management system.

18. The system of claim 10, wherein determining that the first garbage collection version vector is different than the second garbage collection version vector comprises determining that every component of the second garbage collection version vector is at least that of a corresponding component of the first garbage collection version vector.

19. A computer program product, encoded on one or more non-transitory computer storage media, comprising instructions that when executed by one or more computers cause the one or more computers to perform operations comprising:
    maintaining a respective garbage collection version vector for each member of a plurality of members in a distributed data management system, wherein each garbage collection version vector has a plurality of elements that each represent a respective count of garbage collection processes that have been performed by a corresponding member of the plurality of members of the distributed data management system, each garbage collection process being performed by each member on a respective copy of a replicated data region maintained by the member in the data management system and removing data entries marked as deleted in the data region from memory;
    receiving, by a first member of the plurality of members having a first garbage collection version vector, a second garbage collection version vector maintained by a different second member of the plurality of members;
    determining, by the first member, that the first garbage collection version vector is different than the second garbage collection version vector; and
    in response to determining that the first garbage collection version vector is different than the second garbage collection version vector, performing, by the first member, a first replication process is different than a second replication process, wherein the second replication process is performed when the first garbage collection version vector matches every other garbage collection version vector received from one or more other members of the plurality of members.

20. The computer program product of claim 19, wherein the second replication process is a delta replication process.

21. The computer program product of claim 20, wherein the first replication process is a full replication process, and wherein the operations further comprise:
    receiving all data entries stored on the second member.

22. The computer program product of claim 19, wherein the first replication process is a full replication process, and wherein the operations further comprise:
    revoking, by the first member, an update to a data entry stored on the first member.

23. The computer program product of claim 19, wherein the operations further comprise:
    determining, by the first member, that the first member has been restarted; and
    in response, requesting, by the first member, the second garbage collection version vector from the second member.

24. The computer program product of claim 19, wherein each garbage collection process clears memory occupied by each data entry that is marked as a deleted data entry.

25. The computer program product of claim 24, wherein the operations further comprise:
    receiving, by the first member, a request to delete a first data entry; and
    in response, marking, by the first member, the data entry as deleted.

26. The computer program product of claim 19, wherein the operations further comprise:
    performing, by the first member, a garbage collection process to clear memory occupied by one or more data entries that are marked as deleted;
    incrementing, by the first member, a garbage collection version in the first garbage collection version vector; and
    distributing, by the first member, the first garbage collection version vector to one or more other members of the distributed data management system.

27. The computer program product of claim 19, wherein determining that the first garbage collection version vector is different than the second garbage collection version vector comprises determining that every component of the second garbage collection version vector is at least that of a corresponding component of the first garbage collection version vector.

* * * * *

UNITED STATES PATENT AND TRADEMARK OFFICE
CERTIFICATE OF CORRECTION

PATENT NO. : 9,922,043 B1
APPLICATION NO. : 14/524529
DATED : March 20, 2018
INVENTOR(S) : Daniel Allen Smith, Bruce J. Schuchardt and Xiaojian Zhou Page 1 of 1

It is certified that error appears in the above-identified patent and that said Letters Patent is hereby corrected as shown below:

Column 14, Line 64, in Claim 1:
Delete "Maintaining" and insert --maintaining--, therefor.

Signed and Sealed this
Fifteenth Day of May, 2018

Andrei Iancu
*Director of the United States Patent and Trademark Office*